Patented Feb. 24, 1925.

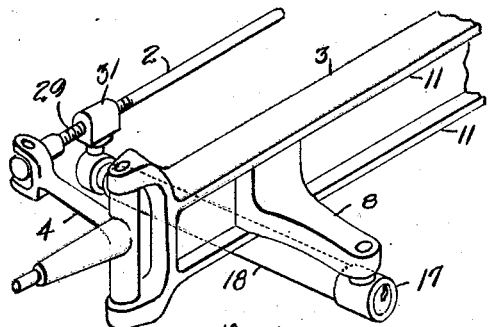
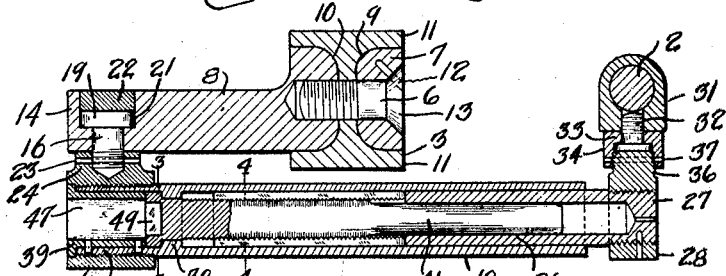
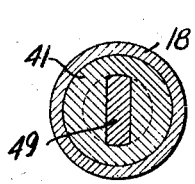
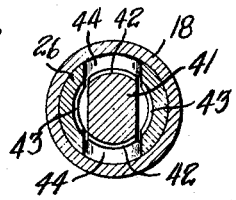
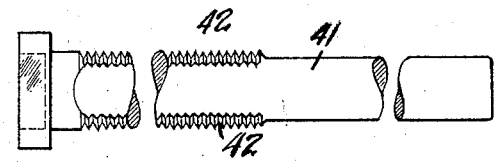
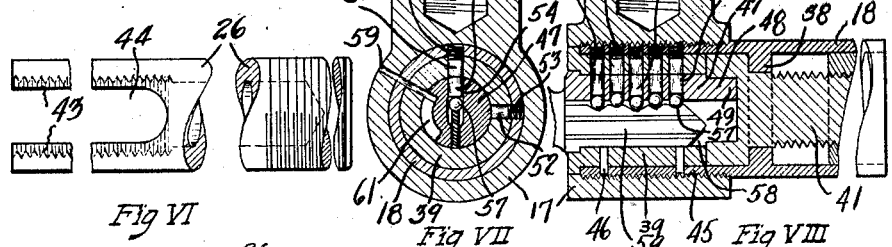
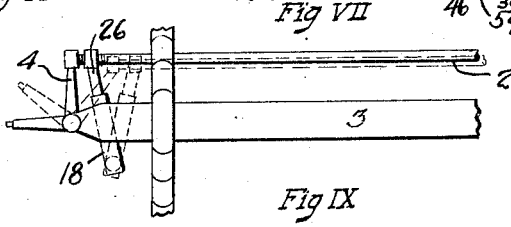

1,527,405

UNITED STATES PATENT OFFICE.

LLOYD H. HALVERSON, OF OAKLAND, CALIFORNIA.

AUTOMOBILE LOCK.

Application filed June 27, 1921. Serial No. 480,530.

*To all whom it may concern:*

Be it known that I, LLOYD H. HALVERSON, a citizen of the United States, and a resident of Oakland, county of Alameda, and State of California, have invented a new and useful Automobile Lock, of which the following is a specification.

My invention relates to a device for locking together the axle and steering rod of an automobile.

An object of the invention is to provide a device by which the steering rod may be readily locked to the axle in any position of the rod.

Another object is to provide a lock of the character described which is arranged to be permanently positioned on the parts to be locked.

A further object is to provide a device of the character described which allows of locking the same in the inoperative as well as in the operative position.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a perspective view of the lock of my invention showing it secured to the automobile parts which it is adapted to lock together.

Figure 2 is a vertical longitudinal section through the device and attached parts.

Figures 3 and 4 are transverse sections taken respectively on the lines 3—3 and 4—4 of Figure 2.

Figure 5 is a side elevation of the lock spindle, portions being removed to reduce the size of the figure.

Figure 6 is a similar view of the lock sleeve.

Figures 7 and 8 respectively, are transverse and longitudinal sectional views of the key lock mechanism.

Figure 9 is a plan view of the device and attached parts showing the same in different positions.

Briefly expressed the device in its present form comprises a pair of telescopic sections which are arranged to be pivotally connected to the steering cross-rod and axle of the automobile. Each section is provided with teeth which may be moved into or out of engagement with the teeth of the other section upon the partial rotation of one of the sections with respect to the other. Means are provided for locking the sections against relative rotative movement when the teeth are either engaged or disengaged.

A detailed description follows:

The steering cross-rod 2 of the automobile is usually connected to the axle 3 through means of the steering knuckle 4, one of which is provided adjacent each end of said parts. The knuckle 4 has a pivoted connection with both the axle and rod so that the latter may swing in an arc toward and from the former.

Secured to the axle 3 as by a screw 6 which passes through a block 7 as well as the axle, is an arm 8 which extends outward perpendicular to the axle in a direction away from the cross-rod 2. The inner faces 9 and 10 of the block and arm fit snugly between the flanges 11 of the axle so that the arm is rigidly held in position. A pin 12 driven into the screw head 13 and block 7 prevents the withdrawal of the screw 6.

Pivotally secured to the end 14 of the arm 8 by means of the vertically disposed screw 16, is a head 17 into which is screwed a cylindrical shell 18. The head 19 of the screw 16 preferably lies below the upper surface of the arm 8 in a reamed hole 21, and a metal plug 22 fills the hole so that the screw cannot be removed. A pin 23 extending through the screw 16 and neck 24 of the head lock these parts against relative movement.

Telescopically mounted in the shell is a sleeve 26 which is adapted to be pivotally connected to the cross-rod 2 for movement similar to the shell 18. The exposed end 27 of the sleeve is screw threaded and is arranged to engage in a head 28. Arranged to engage the threaded portion 29 adjacent the end of the cross-rod 2 is a collar 31 having a pivot screw 32 depending therefrom. The head of the screw 32 is engaged by a shoulder 33 on a nut 34 which has a threaded engagement with the neck 36 of the head 28. A pin 37 through the neck 36 and screw 32 lock the latter members together. From the foregoing it will be clear that a simple effective pivotal connection is afforded between the sleeve 26 and the rod 2.

It will be noted that since the shell and sleeve are both pivotally and telescopically mounted, that the operation of the steering mechanism is as yet unaffected by the device as explained up to the present. In other words the rod 2 is free to move in the arc heretofore referred to. Means are therefore provided for enabling the shell and sleeve to be locked against longitudinal displacement or telescopic movement, and thereby preventing the movement of the rod and consequently the functioning of the steering mechanism. Rotatably mounted within the shell and fixed against relative longitudinal movement therewith by means of the annular shoulder 38 and key-lock casing 39, is a spindle 41 having as here shown longitudinally spaced segmental teeth 42 formed on diametrically opposed sides thereof. The sides of the spindle intermediate the sets of teeth are flattened as clearly shown in Figure 4. The major portion of the spindle is preferably arranged to lie within the sleeve, and the latter is provided on its inner surface with corresponding sets of segmental teeth 43 which when engaged with the teeth 42 of the spindle, lock the shell and sleeve against telescopic movement. In the present embodiment of the invention portions of the opposing sides of the sleeve have been omitted thereby forming open slots 44 whose widths are slightly in excess of the width of the teeth on the segment defining the spindle. Furthermore the flattened sides of the spindle are each slightly greater in width than the width of the teeth of the sleeve. In this manner the spindle may be rotated to a position where the teeth 42 and 43 are in engagement, or to a position where the teeth are entirely disengaged, the former position causing the locking of the members whereas the latter permits the unrestricted relative movement thereof. Since the sets of teeth are two in number and diametrically opposed, a quarter turn of the spindle will effect a full change from one position to another. It will be noted that each set of teeth extends longitudinally for a considerable distance so that when the teeth are disengaged a quarter turn of the spindle will cause the sets of teeth to become engaged regardless of the longitudinal position of the shell with respect to the sleeve; or in other words the shell and sleeve may be placed in locked engagement in any position of the steering mechanism.

Means are provided for locking the spindle against rotation either when the sets of teeth are in or out of engagement. Suitably secured within the end 45 of the shell such as by means of the pins 46, is the lock casing 39 in which is rotatably mounted a barrel 47. The inner end 48 of the barrel is provided with a rectangular or other suitably formed extension 49 which engages in a similar shaped recess formed in the adjacent end of the spindle, so that rotation of the barrel will thus be accompanied by a corresponding movement of the spindle. Arranged within the casing 39 perpendicular to the barrel and at right angles to each other are sets of tumblers 51 and 52 which are pressed inward by springs 53. The barrel 47 is provided with openings 54 into which the tumblers 51 or 52 may enter when the openings are aligned with either set. Each of the openings 54 are engaged by secondary tumblers 56 which rest on balls 57 normally disposed in the bottom of the openings. When the openings are aligned with a set of the casing tumblers, the latter are enabled to partially engage therein and thereby lock the barrel against movement. The barrel is provided with a suitable key slot 58 which communicates with the openings 54, and by inserting a proper key 59 therein the balls and secondary tumblers will be raised a sufficient amount to cause the inner end of the casing tumblers to become circumferentially aligned with the barrel— in which position the latter can be rotated by turning the key. It will thus be seen that by turning the barrel so that the openings will be aligned with one or the other of the casing tumblers the shell and sleeve may be locked in fixed or for slidable engagement. In order that the openings 54 will readily become aligned with the casing tumblers when the barrel is moved from one position to another, a fixed pin 59 is arranged to engage in a slot 61 formed in the barrel, the pin being adapted to engage one of the ends of the slot and thereby limit the movement of the barrel as the openings become aligned.

With the shell and sleeve locked against relative displacement, the movement of the rod as controlled by the locking device would be considerably different than that afforded by the knuckle. This is partly due to the fact that the distance between the knuckle connections is different than the distance between the pivotal connections of the lock, thus tending in each case to move the rod thru arcs of different magnitude and accordingly in more or less different directions. Since movement of the rod thru different arcs at the same time is impossible, an effective locking of the parts naturally results. In order to further increase the tendency of the locking device to resist the movement of the rod, I position the shell and sleeve so that their common axis lies oblique to the axis of the knuckle, thus causing the knuckle and the lock to tend to move the rod thru arcs which are correspondingly more angularly disposed with respect to each other.

I claim:

1. An automobile lock comprising a telescopic member adapted to be pivotally connected to the axle and steering cross-rod of the automobile, said steering cross-rod being connected to said axle by parallel links, whose connecting points are a lesser distance apart than the connecting points of said telescopic member, and means for locking said telescopic member against telescopic movement in a plurality of positions of said rod.

2. An automobile lock adapted to be connected to the steering cross-rod and axle of the automobile, comprising a toothed member arranged to be pivotally connected to one of said parts of the automobile, a second toothed member adapted to be pivotally connected to the other of said parts and being rotatably mounted in telescopic relation to said first member, rotation of said second member serving to place the teeth thereof into or out of engagement with the teeth of the other whereby said members may be held against or for relative slidable movement, and means for locking said members against relative rotative movement.

3. An automobile lock adapted to be connected to the steering cross-rod and axle of the automobile, comprising a member arranged to be pivotally connected to one of said parts of the automobile, a second member adapted to be pivotally connected to the other of said parts and mounted in telescopic relation to said first member, and means operative upon the rotation of one of said members with respect to the other for locking them against relative slidable movement in any position thereof.

4. An automobile lock adapted to be connected to the steering cross-rod and axle of the automobile, comprising a toothed member arranged to be pivotally connected to one of said parts of the automobile, a second toothed member adapted to be pivotally connected to the other of said parts and being rotatably and telescopically mounted with respect to said first member, rotation of said second member serving to place the teeth thereof in or out of engagement with the teeth of the other whereby said members may be held against or for relative slidable movement, and means for locking said members against rotative movement when said teeth are engaged with or released from each other.

5. A device for locking together the steering cross-rod and axle of an automobile comprising a toothed member adapted to be pivoted on a vertical axis to one of said parts of the automobile, a toothed sleeve adapted to be pivoted on a vertical axis to the other of said automobile parts and telescopically disposed about said toothed member, means for rotating said toothed member with respect to said sleeve whereby the teeth of the sleeve and member may be moved into or out of engagement with each other and thereby respectively prevent or permit the slidable movement of the sleeve with respect to the member, and means for locking said member and sleeve against relative rotation when the teeth thereof are in or out of engagement.

6. In a device for locking together the steering rod and axle of an automobile, a shell adapted to be pivotally connected to one of said automobile parts for movement about a vertical axis, a sleeve adapted to be connected to the other of said automobile parts for similar movement and being telescopically arranged within said shell, longitudinally spaced teeth formed in said sleeve, a spindle rotatably fixed in said shell and arranged to lie within said sleeve, longitudinally spaced teeth formed on said spindle arranged to be placed in or out of engagement with the teeth of the sleeve upon the rotation of said spindle, and a lock for holding said teeth in or out of engagement with each other.

7. In a device for locking together the steering rod and axle of an automobile, an arm adapted to be fixed to said axle and extending away from said rod, a shell pivotally secured to said arm for movement about a vertical axis, a sleeve adapted to be secured to said rod for similar pivotal movement and being telescopically mounted within said shell, longitudinally spaced teeth formed in said sleeve, a spindle rotatably fixed in said shell and arranged to lie within said sleeve, longitudinally spaced teeth formed on said spindle arranged to be placed in or out of engagement with the teeth of the sleeve upon the rotation of said spindle, and a key-lock held in said shell having its barrel fixed for rotation with said spindle and adapted to be locked against movement when said teeth are engaged with or disengaged from each other.

8. In a device for locking together the steering rod and axle of an automobile, an arm adapted to be fixed to the axle and projecting away from said rod, a shell pivotally secured to said arm for movement about a vertical axis, a sleeve adapted to be secured to said rod for similar movement about a vertical axis and being telescopically mounted within said shell, longitudinally spaced segmental teeth formed in said sleeve, a spindle rotatably mounted within said shell and held against longitudinal displacement relative thereto, longitudinally spaced segmental teeth extending from the sides of said spindle arranged to be placed in or out of engagement with the teeth of said sleeve upon the rotation of said spindle, and a key lock fixed in said shell having a barrel fixed for rotation with said spindle and adapted to be locked against movement when said teeth are in or out of engagement with each other whereby said shell and sleeve may be locked for or against telescopic movement.

9. An automobile lock comprising relatively rotatable and telescopically engaged members attached to the steering cross-rod and axle of the automobile, and means operative upon the relative rotation of one of said members to interlock said members against telescopic movement.

In testimony whereof, I have hereunto set my hand at Oakland, this 16th day of June, 1921.

LLOYD H. HALVERSON.